June 17, 1947.  N. W. BRYANT  2,422,182
OBJECT LOCATING SYSTEM
Filed May 17, 1944  2 Sheets-Sheet 1
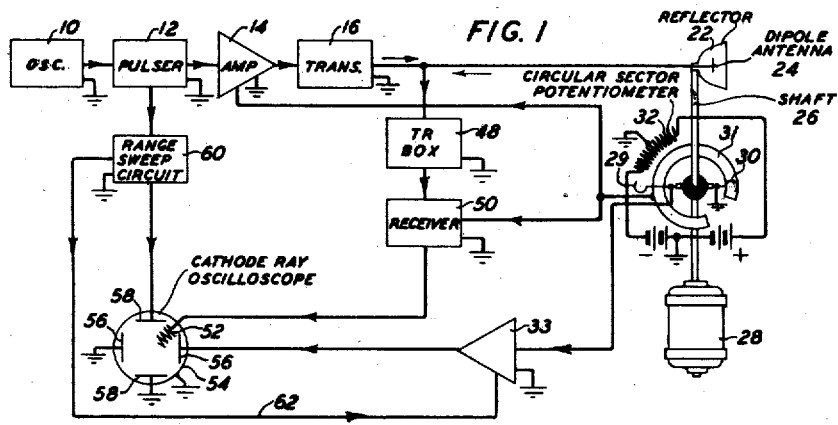
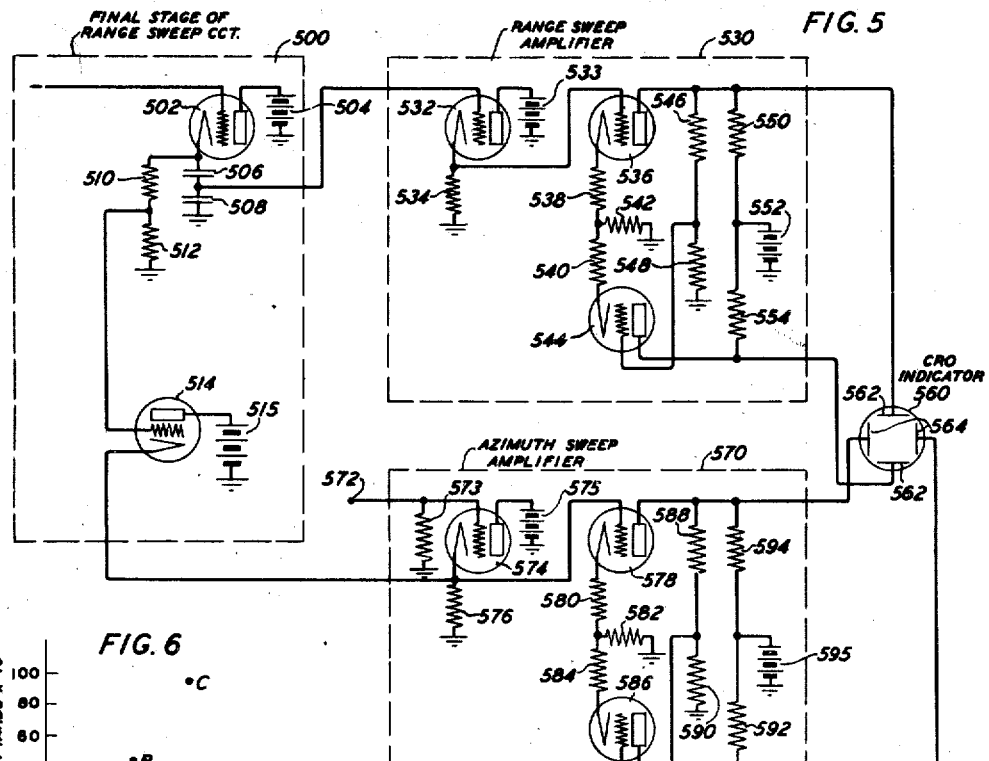
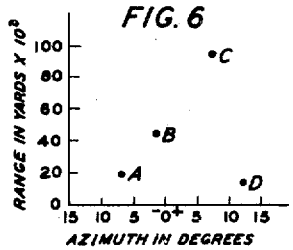
INVENTOR
N. W. BRYANT
BY H. O. Wright
ATTORNEY June 17, 1947.  N. W. BRYANT  2,422,182
OBJECT LOCATING SYSTEM
Filed May 17, 1944    2 Sheets-Sheet 2

INVENTOR
N. W. BRYANT
BY
ATTORNEY

Patented June 17, 1947

2,422,182

UNITED STATES PATENT OFFICE 2,422,182

OBJECT LOCATING SYSTEM

Newton W. Bryant, Chatham, N. J., assignor to Bell Telephone Laboratories, Incorporated, New York, N. Y., a corporation of New York Application May 17, 1944, Serial No. 535,938

3 Claims. (Cl. 250—1.62)

This invention relates to energy reflection type object locating systems and to methods of and arrangements for increasing the accuracy of direction indications in connection with "class B" long range indications and the like provided by such systems.

By way of example, in the typical "radar" providing "class B" indications, a highly directive beam antenna is caused to scan an area of interest by rotating (or oscillating) uniformly about a vertical axis while high power extremely short radio energy pulses are emitted at frequent regular intervals. Reflections of these pulses from objects within the area of interest are received, usually by the same antenna that is employed to emit the pulses, the pulses are amplified and detected and the video frequency pulses thus obtained are employed to provide indications on an oscilloscope screen, the ray of the oscilloscope being caused to horizontally scan the oscilloscope screen in synchronism with the azimuthal scanning of the area of interest by the antenna. At the same time the oscilloscope ray is deflected vertically each time a pulse is emitted, the deflection being substantially linear and of a duration sufficient that a reflected pulse from an object at the maximum distance to be measured will produce an indication near the upper limit of the vertical deflection. The emitted pulses must, of course, be spaced at least sufficiently in time to permit the receipt of an echo from an object at the maximum distance to be measured, to be received before the next successive pulse is emitted.

Thus a substantially rectangular area of the oscilloscope screen is scanned by the oscilloscope ray and a pattern of indications is obtained therein (the ray being intensity modulated by each of the echo pulses at the moment it is received).

For any particular indication, its horizontal position represents the azimuth of the object from which the echo is received and its vertical position represents the range of the object, that is the distance of the object from the radar system.

Such systems have heretofore followed the well-known arrangements of the television art in which the oscilloscope beam or movable element of the indicator is synchronized to scan the rectangular area of the oscilloscope screen simultaneously with the scanning of an actual rectangular area to be explored by the exploratory energy beam of the televsion system. This, of course, is done in televsion systems so that the oscilloscope beam position at each and every instant represents with respect to its screen the relative position of the exploratory beam with respect to the area being scanned. The arrangement is obviously satisfactory for normal television purposes where the area being scanned is at least approximately a plane, all points of which are substantially equidistant from the observation point and, furthermore, in the usual television system the travel time of the scanning beam to all points on the area scanned and (by reflection) back to the television apparatus is so short and substantially uniform that it can be ignored.

In radio pulse reflection object locating systems (radars), however, ranges varying from 0 to 100,000 yards, or more, are frequently employed and the travel time of the exploratory energy from the point of observation to the reflecting objects and back to the observation point is, consequently, a factor which varies appreciably and must be taken into consideration when high precision directional long range indications are desired. For this reason the present invention teaches modified oscilloscope scanning methods and arrangements which take into account the travel time of the exploratory waves for long ranges and thereby provide indicator patterns of improved directional accuracy. Stated briefly, the method comprises scanning the oscilloscope screen in the direction representing, for example, azimuth following the emission of each exploratory pulse at a rate representing precisely half that at which the directive antenna scans in azimuth while the oscilloscope is performing its normal range sweep, and then rapidly changing the oscilloscope azimuth scanning voltage to, in effect, bring the ray into coincidence again with the antenna azimuth at the instant the next successive pulse is emitted. This compensates for the fact that the antenna azimuth is changing during the return time interval, i. e., during the interval between the instant of the reflection of energy at the object and the instant at which the reflected energy arrives back at the radar.

A principal object of the invention is, therefore, to provide methods and arrangements to improve the directional accuracy, particularly at the longer ranges, of indicator patterns of pulse reflection object locating systems of the type which present "class B" indications, or the equivalent.

Other and further objects will become apparent during the course of the following description and in the appended claims.

The principles of the invention will be more readily understood in connection with the detailed description hereinunder of the illustrative embodiments thereof, shown in the accompanying drawings, in which:

Fig. 1 shows in block schematic diagram form an improved radio pulse reflection object locating system of the general type which provides "class B" indications;

Fig. 5 illustrates in electrical schematic diagram form a circuit for providing the improved azimuth sweep voltage of the invention; and Fig. 6 shows to a reduced scale a "class B" indication such as could be provided by the system of Fig. 1.

Figure 2:
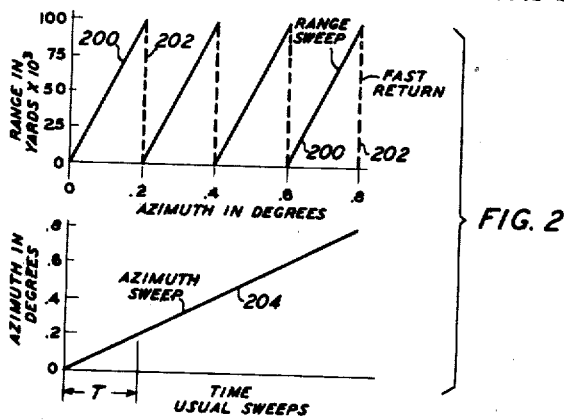
Fig. 2 illustrates in diagrammatic form the usual combination of sweep voltages employed with prior art systems of the general type illustrated in Fig. 1.

In more detail in Fig. 1, an oscillator 10 provides a sine wave or equivalent timing wave of a frequency equal to the desired rate of emission of pulses by the radar system. The maximum pulse rate is, as above mentioned, determined by the time required for a radio pulse to travel to a target at maximum range and return by reflection to the radar, added to the time required to restore sweep, range and associated circuits to their "starting" condition, that is, the condition in which they are ready to repeat their normal functions as required upon the emission of the next successive exploratory pulse by the radar system.

By way of example, in a typical radio system for measuring ranges to a maximum of 100,000 yards a pulsing rate of approximately 2,000 pulses per second was found appropriate.

Pulser 12 responds to the sine wave output of oscillator 10 by generating a short pulse for each cycle. Several suitable forms of pulsers are well known to those skilled in the art including, for example, those employing a non-linear reactance and those employing reactive circuits in combination with spark discharge devices. Pulses from pulser 12 are amplified in amplifier 14 and actuate transmitter 16 which energizes dipole antenna 24 to emit short radio pulses of from ½ to 2 microseconds in duration. Dipole antenna 24 is situated at the focus of a parabolic or similar type of "bowl" reflector 22, the reflector and antenna being supported on vertical shaft 26 which is, for example, adapted to be rotated by motor 28. Shaft 26 serves also to turn brushes 29 and 30 in synchronism with the antenna system. Brush 29, during a selected sector or portion, for example, a sector of 30 degrees of the antenna rotation, traverses circular sector potentiometer 32, the mid-point of which is grounded and across the terminals of which battery 46 is connected, the battery's mid-point also being grounded. Brush 29 is insulated from shaft 26 and connects to azimuth sweep amplifier 33 which in turn connects to a horizontal deflecting plate 56 of cathode ray oscilloscope 54, the other horizontal deflecting plate 56 being grounded.

On the selected sector of a complete revolution of the antenna system, the combination of potentiometer 32, battery 46, and brush 29 provides a deflecting voltage which varies regularly with rotation of the antenna through that sector from a maximum negative value through zero or ground potential to a like maximum positive value. During the remaining portion, i. e., 330 degrees if the selected sector is 30 degrees, of each rotation of the antenna system, brush 30, which is connected to ground, makes contact with the circular sector conducting member 31, the latter being connected to amplifier 14 and receiver 50. The ground thus forwarded to these units functions by the method, familiar to those skilled in the art, of altering a critical bias of each unit to "blank" them, i. e., to reduce their output to substantially zero throughout the non-selected sector of each rotation of the antenna system. Alternatively, the antenna could, obviously, be oscillated back and forth through the active sector only of its complete rotation and units 14 and 50 would not then need to be blanked. However, where the rotating parts have considerable mass continuous rotation as described above presents much simpler mechanical design problems and makes it possible to obtain more uniform and rapid antenna azimuth scanning action.

Reflections of the emitted pulses from objects within the area scanned by the antenna are received by dipole 24 during the intervals between successive transmitted pulses. "TR box" 48 comprises, in its most usual form, a resonant cavity normally tuned to the frequency of the energy being radiated, the cavity including therein a gas tube bridged across two points of different potential within the cavity. The gas tube breaks down under the high voltages resulting from the high power transmitted pulses and detunes the cavity of the TR box thus protecting receiver 50 from damage or from "blocking" effects which might result from "overloading." Upon the termination of each transmitted pulse the gas tube recovers substantially instantaneously and permits the received reflected pulses to enter receiver 50. Transmitter 16, when quiescent, presents a high impedance to the received reflected pulses and consequently absorbs no substantial amount of power from them.

Receiver 50 detects the received reflected radio pulses and amplifies the resulting video pulses and applies the amplified video pulses to the control anode 52 of oscilloscope 54 to intensity modulate the ray thereof at the instant each reflected pulse is received.

Sweep circuit 60 provides a saw-toothed sweep voltage wave to vertical deflecting plate 58 of oscilloscope 54, the sweep wave being initiated in response to each pulse generated by pulser 12 so that the ray of oscilloscope 54 is deflected vertically at a uniform rate following the emission of each transmitted pulse. The rate of this deflection is adjusted so that the time required for a complete vertical sweep is equal to the reflection time of an echo pulse from an object at the maximum range which the system is intended to measure, so that the vertical position of each indication appearing on the screen of the oscilloscope 4 will indicate the range of the reflecting object from which the particular reflected pulse is received. Lead 62 from sweep circuit 60 to azimuth sweep amplifier 33 provides energy for modifying the azimuth sweep in accordance with the present invention to correct for reflection time of the echoes from more distant objects and thus to improve the azimuthal accuracy of the indications provided on the screen of the oscilloscope, as will be described in detail hereinunder.

The system of Fig. 1 obviously provides a "class B" indication, that is, an indication in which the azimuth of each bright spot on the screen of the oscilloscope, corresponding to an object in the area scanned by the exploratory beam, is represented by the horizontal position thereof and the range of each spot is represented by its vertical position on the screen. An indication of this type is shown to a reduced scale in Fig. 6 and will be described in detail hereinafter.

Figure 3:
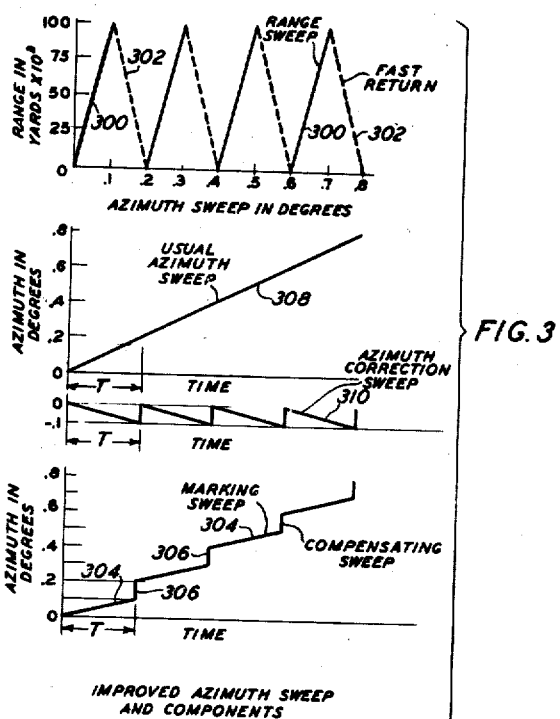
Fig. 3 illustrates in diagrammatic form the improved combination of sweep voltages of the invention and component voltages which can be conveniently combined to provide the improved indicator azimuth sweep voltage.
Figure 4:
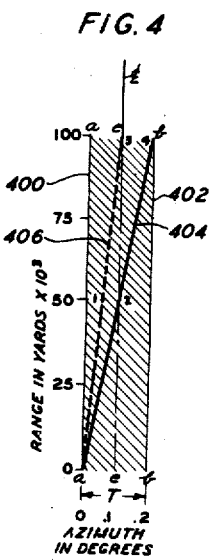
Fig. 4 shows a segment of a "class B" indication including a single range sweep and is employed in explaining the nature and advantages of the improved azimuth sweep of the invention.

In Figs. 2, 3 and 4 the usual and the improved sweep voltages and sweep paths are indicated and their significance will now be explained. In Fig. 4, it will at first be assumed, for the sake of simplicity, that the time T is both the time required for an echo to return from an object at maximum range and the time from the emission of one exploratory energy pulse to the instant just preceding that at which the next successive energy pulse will be emitted.

It will further be assumed that, in a typical case, the antenna moves through an azimuth angle of .2 degree during the time interval T and that the maximum range of the system is 100,000 yards.

In the usual radar system providing a "class B" indication it has been customary to employ a uniformly increasing linear azimuth sweep voltage as illustrated by line 204 of Fig. 2 and a range sweep voltage therewith such as is illustrated by saw-tooth diagram comprising sweeps 200 and "fast returns" 202 of Fig. 2, each of the sweeps 200 occurring during a time interval T and the "returns" 202 occurring substantially instantaneously.

In Fig. 4, the corresponding usual range and azimuth sweeps for the same assumed conditions would produce a range trace 404. Since the echo pulse requires the same time interval to return that the emitted pulse required to reach the object at maximum range, a pulse emitted at instant $a$ will return an echo from an object at maximum range at the instant $b$ and the reflected pulse or echo, perforce, will have originated at an instant $e$ halfway, in time, between $a$ and $b$ (or at time $T/2$ from instant $a$ at which the pulse was emitted). It is obvious, therefore, that the azimuthal accuracy of the indication will be increased by employing a combination of range and azimuth sweeps such that during the interval of time T while the range trace is sweeping the full 100,000 yard range, the azimuth trace is sweeping precisely one-half the actual angle being swept by the antenna, i. e., in the case assumed .1 degree. In preparation for the next succeeding range trace the azimuth sweep must, obviously "catch up with" the antenna, i. e., it must cover that interval on the screen which represents the second half of the antenna's azimuthal motion by a substantially instantaneous change, simultaneously with the substantially instantaneous "fast return" of the range sweep trace to its starting position for the next successive sweep.

Clearly, this requires an azimuth sweep voltage as shown by trace 304, 306 of Fig. 3 in which, during time interval T, the azimuth sweep progresses linearly .1 degree at an appropriate slow rate and then increases substantially instantaneously to .2 degree, etc. as shown, while the range trace carries on normally, covering its full 100,000 yards for each time interval T and returning substantially instantaneously at the end of each sweep to the starting position for the next successive sweep. When plotted against the new indicator azimuth sweep 304, 306 of Fig. 3, however, the range trace will be as shown by sweep lines 300, 302 of Fig. 3, the full range 300 being swept during the first .1 degree of the indicator azimuth sweep 304 and the "fast return" 302 taking place with the substantially instantaneous change 306 in the azimuth sweep as shown in Fig. 3.

The desired indicator azimuth sweep voltage 304, 306 of Fig. 3 is readily attained by combining with the usual azimuth sweep voltage of the prior art, represented by sweep 204 of Fig. 2 and duplicated by sweep 308 of Fig. 3, the negative saw-toothed wave represented by azimuth correction sweep 310 of Fig. 3. Since the latter sweep 310 has the same period and differs merely in amplitude from the saw-toothed range sweep voltage 200, 202 of Fig. 2 (reproduced to the new indicator azimuth sweep scale in Fig. 3 as sweep 300, 302) it can be readily obtained by selecting the proper amplitude of voltage from the source of range sweep voltage and combining it in reversed polarity with the positive straight line azimuth sweep voltage 204 or 308.

It has, for simplicity, been assumed above that a pulse is emitted at the beginning of each time interval T, the time interval T being defined as that required for a reflected (or echo) pulse from an object at the maximum range of 100,000 yards to arrive back at the radar station. As previously mentioned, in actual practice, it is frequently found convenient to allow a further interval of time of a few microseconds in which the several sweep circuits and the indicator may perform the functions above referred to as occurring "substantially instantaneously." Also for routine searching operations, it may be desirable to substantially decrease the pulsing rate in order to prolong the useful life of the transmitting vacuum tube or tubes. In such cases the radar receiver is usually "blanked" by an energy pulse which is initiated upon the termination of one range sweep and terminated just prior to the start of the next successive range sweep. Obviously, such arrangements, which are well known to those skilled in the art, can be incorporated in the systems of the invention and in no way change the principles and technique involved in applying the invention to a particular radar system, the only practical effect being that fewer pulses are emitted per second and that the "substantially instantaneous" changes required by the assumed conditions can be spread over the portion of an interpulse interval which is not required for the range sweep.

It should be further noted that though the correction effected in the azimuth angle by the arrangements of the invention is, for the particular case assumed, relatively very small, being in the order of .1 degree, at the maximum range of 100,000 yards, such an error in the absolute azimuth angle of the target results in a positional error of the target in the order of 200 yards in azimuth. Corresponding target positional errors in azimuth for ranges of 50,000 yards, 30,000 yards and 20,000 yards are approximately 40 yards, 15 yards and 7 yards respectively, for an error of .1 degree in azimuth angle. At ranges exceeding 100,000 yards the correction, of course, becomes proportionately greater.

It may again be objected that since the exploratory beam of the usual radar antenna covers from a half to one or more degrees in azimuth angle that a correction in the order of .1 degree is meaningless. In actual practice, however, it has been found that, though the indication of the cathode ray oscilloscope may be a degree or more in breadth, the center of the indication, if its ends are accurately defined by the means of the present invention, will give the true azimuth angle of the target, as checked by extremely accurate optical devices, within less than .1 degree. It is, accordingly, believed that the increased accuracy afforded by the arrangements of the invention is not of an illusory nature. Furthermore, antenna arrangements providing increasingly sharper exploratory beams may reasonably be expected to be developed as the art progresses.

The correction afforded by the arrangements of the invention can, as suggested above, be considered as the result of fixing the azimuthal position of the indication on the oscilloscope corresponding to a particular target, with respect to the instant at which reflection occurs rather than, as is usually done, with respect to the instant at which the reflection is received by the radar.

In Fig. 5, a suitable circuit for providing the desired range sweep and the new indicator azimuth sweep voltages, as described in detail above, is given in schematic diagram form.

In Fig. 5, circuit 500 represents the final stage of a saw-tooth wave range sweep generator, the preceding stages of which can be of any of the several conventional designs of saw-tooth wave generator well-known in the art. In the final stage 500, the cathode circuit of vacuum tube 502 includes a voltage divider comprising resistors 510 and 512 connected in series, the lower terminal of resistor 512 being grounded. This voltage divider serves to provide at the junction of resistor 512 with resistor 510 a saw-tooth voltage of smaller amplitude as required for combination with a linear azimuth sweep voltage to provide the stepped azimuth sweep voltage 304, 306 of Fig. 3 desired in accordance with the principles of the invention and described in detail above.

The range sweep and azimuth sweep amplifiers 530 and 570 respectively, are of conventional design and provide balanced (to ground) output circuits which connect to the deflection plate pairs 562 (vertical) and 564 (horizontal), respectively, of the cathode ray oscilloscope indicator 560.

The input terminal 572 of amplifier 570 is connected for normal operation to a conventional source of linear sweep voltage suitable for providing the usual linear azimuth sweep. This voltage is, of course, impressed across resistor 573 in the control grid circuit of input tube 574. The portion of the range sweep voltage, i. e., the azimuth correction sweep voltage, obtained from voltage divider 510, 512 described above, is introduced through the coupling circuit comprising the cathode follower vacuum tube 514 for which potential source 515 supplies the proper anode voltage. The correction voltage is applied across resistor 516 in the cathode circuit of input tube 574 so that in the cathode circuit of tube 574 the positive linear azimuth sweep is combined with an effectively negative saw-tooth range sweep voltage component, the combined voltages being further amplified in the balanced output stage comprising vacuum tubes 578, 586 and the associated resistors and battery supply and is then applied to horizontal deflecting plates 564 of oscilloscope 560 as shown in Fig. 5 and as previously described.

In Fig. 5 a negative range saw-tooth voltage at the cathode of tube 502, impresses a similar negative saw-tooth on the grid of tube 532, which in turn impresses a negative saw-tooth on the grid of tube 536. This causes a positive range saw-tooth, as in Fig. 2, at the plate of tube 536 and at the upper plate of the CRO tube thus producing a vertical sweep from bottom to top.

In a like manner, a positive azimuth saw-tooth of the same type as 204, Fig. 2 or 308 of Fig. 3 when applied to terminal 572, and the grid of tube 574 causes a positive saw-tooth wave to be applied to the grid of tube 578, which in turn causes a negative saw-tooth at the plate of tube 578 and at the left plate of the CRO tube, thus producing a horizontal sweep from left to right.

The coupling circuit, comprising tube 514, adds the small amount of the range sweep saw-tooth wave 310 of Fig. 3 to the azimuth saw-tooth wave 308, the two being combined so that they are of opposite sign and produce the stepped azimuth sweep shown in the lowest trace of Fig. 3.

In Fig. 6 a common type of "class B" indication for use on mobile craft is shown to a reduced scale. The mid-scale of the horizontal, or azimuth, dimension is designated zero and in a usual case corresponds with the direction of the heading of the craft. Fifteen degrees in azimuth angle is then shown at each side, assuming a sector of 30 degrees is to be scanned, angles to the right being designated as positive and those to the left as negative, for convenient reference. Range is indicated by the vertical position of each indication. For example, indication A represents an object at 7 degrees left and 20,000 yards distant, B represents an object at 2 degrees left and 40,000 yards distant, etc. Very often some other sector than 30 degrees, in azimuth, is scanned by the antenna, in which case the azimuth actually scanned is, of course, spread on the oscilloscope screen.

Numerous and varied applications of the principles of the invention in addition to those described above may be readily devised by those skilled in the art within the spirit and scope of the invention. For example, a pulse-reflection type compressional wave object locating system providing class B indications could readily be devised to incorporate the principles of the invention, and in view of the relatively slow speed of propagation of compressional waves a very substantial improvement in the directional accuracy of the indications could thus be effected even at relatively short ranges.

The invention is defined in the following claims.

What is claimed is:

1. In a radar system of the type which sweeps an area in azimuth by a highly directive energy beam and simultaneously determines the range of reflecting objects by timing reflections therefrom of the directive beam, an indicator in which a movable indicating means is swept along one dimension to provide a positional representation of azimuth angle and simultaneously along a second orthogonally related dimension to provide a positional representation of range, means for controlling the azimuth sweep of the indicating means during each range sweep to represent precisely half the azimuth sweep of the exploratory beam, and means for advancing the azimuth sweep of the indicating means at the end of each range sweep thereof to represent the azimuth position of the exploratory beam at the start of the next range sweep of said indicating means.

2. A ranging and direction indicating system comprising a directive radiating and receiving device, a source of energy pulses operatively associated with said device and periodically energizing said device to radiate energy pulses, means for uniformly rotating said device, means for detecting reflections of said radiated pulses received by said device, a cathode ray oscilloscope indicator including a pair of vertical deflecting plates, a pair of horizontal deflecting plates, and a control anode, said anode being operatively connected with said detecting means, a linear range sweep circuit synchronized with said emitted pulses and operatively connected with said vertical deflecting plates, a linear azimuth sweep circuit synchronized with said rotating means and operatively connected with said horizontal deflecting plates and an azimuth sweep compensating circuit operatively connecting said range and azimuth sweep circuits to contribute a predetermined amount of said range sweep voltage to said azimuth sweep circuit.

3. In the operation of a system for determining the direction and range of objects within a predetermined area, the system being of the type in which energy pulses are radiated by a highly directive device which device is rotated uniformly to sweep or scan said area and reflections of said pulses from objects within said area are received by receiving means and indications corresponding thereto are displayed on an oscilloscopic device having a movable marking means, vertical and horizontal deflecting means for said marking means and a marking control means, the marking means of said oscilloscopic device being deflected vertically by a range sweep control means synchronized to start with the emission of each pulse, the marking means further being deflected horizontally to represent the angular position of the directive device at each instant, the marking control means of said oscilloscope being operatively connected with the receiving means to produce an indication of each received reflected pulse at the instant of its reception, the improvement of the method of operation of said system which comprises retarding the horizontal sweeping action of said marking means between the instants at which the range sweep starts and ends, respectively, and accelerating said horizontal sweeping action between the instant at which the range sweep ends and the instant at which the next successive energy pulse is emitted, the retarding and accelerating actions being proportioned to bring the marking means at the instant of emission of the next successive pulse to the horizontal position on the oscilloscopic means representing the actual angular position of the directive device at that instant.

NEWTON W. BRYANT.

REFERENCES CITED

The following references are of record in the file of this patent:

UNITED STATES PATENTS

| Number | Name | Date |
|---|---|---|
| 1,955,332 | Iams | Apr. 17, 1934 |
| 2,250,819 | Wolf | July 20, 1941 |
| 2,275,460 | Page | Mar. 10, 1942 |